United States Patent [19]

Thujiuchi et al.

[11] 4,403,829
[45] Sep. 13, 1983

[54] ANGLE ADJUSTING ARRANGEMENT FOR ADJUSTING AN ELEMENT ABOUT TWO AXES

[75] Inventors: Yoshio Thujiuchi, Nagoya; Yorinobu Sumi, Gifu, both of Japan

[73] Assignee: Kabushiki Kaisha Tokai Rika Denki Seisakusho, Aichi, Japan

[21] Appl. No.: 261,137

[22] Filed: May 4, 1981

[30] Foreign Application Priority Data

May 8, 1980 [JP] Japan .............................. 55-63626[U]

[51] Int. Cl.³ ................................................ B60R 1/06
[52] U.S. Cl. ..................................................... 350/289
[58] Field of Search ......................... 350/289; 248/487

[56] References Cited

U.S. PATENT DOCUMENTS 3,609,014  9/1971  Kurz, Jr. .............................. 350/289
4,202,603  5/1980  Miyauchi ............................. 350/289

FOREIGN PATENT DOCUMENTS 3039343  4/1981  Fed. Rep. of Germany ...... 350/289
2054496  2/1981  United Kingdom ................ 350/289

Primary Examiner—F. L. Evans
Attorney, Agent, or Firm—Wenderoth, Lind & Ponack

[57] ABSTRACT

An improved angle adjusting arrangement for mirrors of a motor vehicle and the like includes a fixing base which is provided in a mirror case and to which approximately the central portion of a rear face of a back cover member for supporting a mirror is pivotally connected, and driving units each having a reversible motor, a mirror push-pull control shaft and power transmitting members which are accommodated in a compact housing and arranged to transmit the power of the reversible motor to the mirror push-pull control shaft for selective advancing or retraction of the mirror push-pull control shaft in the axial direction so as to laterally and vertically adjust the angles of the mirror.

6 Claims, 4 Drawing Figures

ANGLE ADJUSTING ARRANGEMENT FOR ADJUSTING AN ELEMENT ABOUT TWO AXES

BACKGROUND OF THE INVENTION

The present invention relates to an angle adjusting arangement for mirrors and more particularly, to an arrangement for adjusting angles, for example, of the so-called outer or external reflecting mirrors such as fender mirrors, door mirrors, etc. for motor vehicles, from the interior of the motor vehicles through remote control.

Initially, for an angle adjusting arrangement of the above described type, a wire control system which effects angle adjustments by moving mirrors through a wire was adopted. However, there has been proposed an electric driving system in which driving motors and power transmission members are accommodated at the back of the mirror in a mirror case for electrically adjusting the angles of the mirror, with further improvements being applied thereto up to the present.

Although the angle adjusting arrangement with the electric driving system as described above further includes various types of devices, it is generally so arranged that a driving mechanism for laterally moving the mirror and another driving mechanism for vertically tilting the mirror are accommodated in one housing which is disposed at the rear side of the mirror in the mirror case, while approximately the central portion of the rear face of the mirror is pivotably coupled to the mirror case, with respective forward ends of a mirror push-pull control shaft for lateral movement of the mirror and another mirror push-pull control shaft for vertical movement of the mirror being connected to the rear face of the mirror.

The known arrangement as described above in which the respective driving mechanisms are accommodated in the one housing has such disadvantages that the housing tends to be large in size and also limited in its configuration, thus resulting in restriction not only in the design of the driving mechanisms themelves, but in the choice of the mirror shapes which simultaneously serve for external decorations of the motor vehicle.

SUMMARY OF THE INVENTION

Accordingly, an essential object of the present invention is to provide an improved mirror angle adjusting arrangement for motor vehicles and the like which is compact in size and having a small-sized housing readily incorporated therein with driving mechanisms and easily installed in a mirror case, with consequent reduction in the restrictions of configurations of the mirror case and facilitation in maintenance, requiring replacement only of an entire faulty unit in the event of a breakdown.

Another important object of the present invention is to provide an improved mirror angle adjusting arrangement of the above described type which is simple in construction and accurate in function at high reliability, and which can be readily incorporated into various types of motor vehicles and the like at low cost.

In accomplishing these and other objects, according to one preferred embodiment of the present invention, there is provided an angle adjusting arrangement for mirrors of a motor vehicle and the like including a fixing base which is provided in a mirror case and to which approximately the central portion of a rear face of a back cover member for supporting a mirror is pivotally connected, and driving units each having a reversible motor, a mirror push-pull control shaft and power transmitting members which are accommodated in one housing and arranged to transmit the power of the reversible motor to the mirror push-pull control shaft for selective advancing and retraction of the mirror push-pull control shaft in the axial direction. The driving units are accommodated at the back of the back cover member within the mirror case, one unit selectively at the right or left side, and the other unit selectively at an upper or lower side with respect to the central portion of the back cover member, and secured to the fixing base and other corresponding fixing portions provided in the mirror case. The mirror push-pull control shafts each extend outwardly from the respective housings of the driving units and are connected at their forward ends to the rear face of the back cover member.

By the arrangement according to the present invention as described above, an improved angle adjusting arrangement compact in size and simple in construction has been advantageously presented, with substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
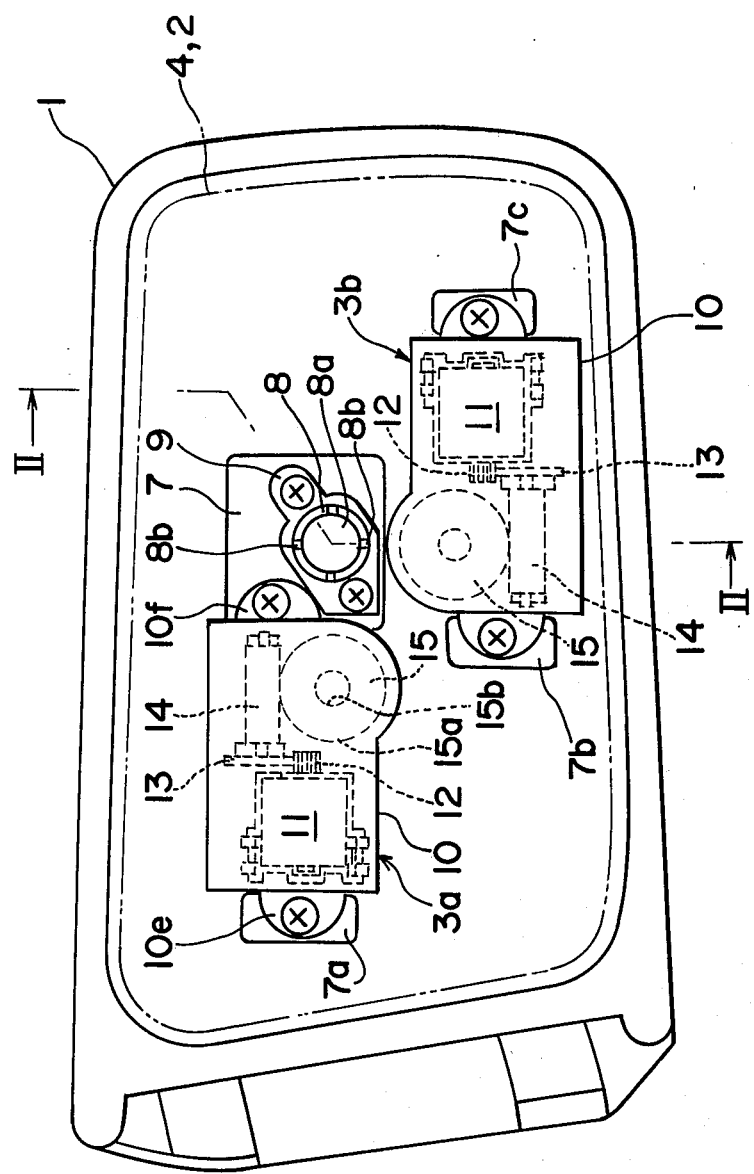
FIG. 1 is a front elevational view showing the construction of an angle adjusting arrangement according to one preferred embodiment of the present invention as applied to a door mirror of a motor vehicle.

Referring now to the drawings, there is shown in FIG. 1 an angle adjusting arrangement according to one preferred embodiment of the present invention as applied, for example, to a reflecting mirror for a door of a motor vehicle (not shown). The mirror angle adjusting arrangement of FIG. 1 generally includes a mirror case 1, a reflecting mirror 2 and two driving units 3a and 3b accommodated in mirror case 1 for moving or tilting mirror 2 which is supported by a back cover or rear cover member 4 in the mirror case 1.

Figure 2:
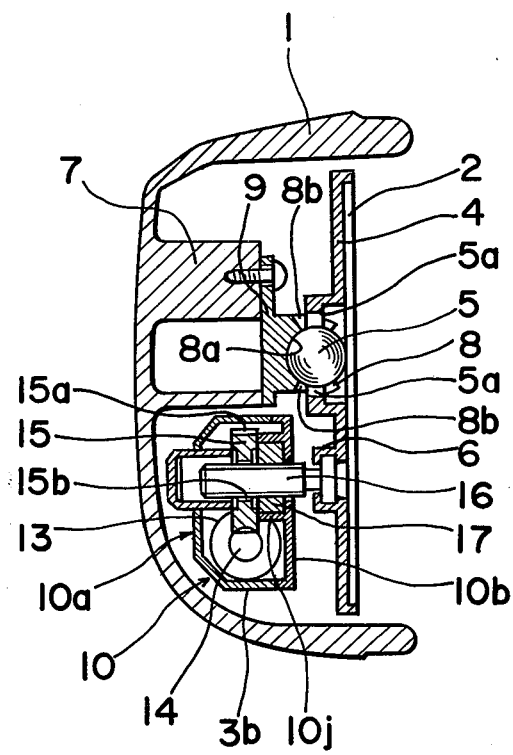
FIG. 2 is a cross section taken along the line II—II of FIG. 1.

The back cover member 4 has a spherical portion 5 provided at approximately the central portion of its rear face, and connected, by arm portions 5a thereof, to the body of the cover member 4, while two bearing portions 6 are formed respectively on the rear face of the back cover member 4, one at the left side (FIG. 1) of the spherical portion 5, and the other at the lower portion (FIGS. 1 and 2) thereof.

At approximately the central portion inside the mirror case 1 in a position corresponding to the spherical portion 5 of the back cover member 4, there is provided a fixing base 7, to which a support member 9 which has a projecting portion 8 extending upwardly therefrom and formed with a semi-spherical recess 8a at its forward end, is secured, for example, by screws. Accordingly, the spherical portion 5 for the back cover member 4 as described above is movably received in the semi-spherical recess 8a of the projecting portion 8 of the support member 9. The projecting portion 8 has slits 8b formed in the peripheral edge of semi-spherical recess 8a in positions corresponding to the arm portions 5a of the spherical portion 5 for receiving arm portions 5a in the slits 8b thereof.

The driving units 3a and 3b to be accommodated in the mirror case 1 are of the same construction, and respectively are disposed at the left side and lower side of the fixing base 7 or the support member 9, i.e. at the left side and lower side of the spherical portion 5 of the back cover member 4 as shown in FIG. 1. It is to be noted that the driving unit 3b at the lower position is positionally so directed as the driving unit 3a at the left side, but rotated rightwards through 180° in FIG. 1.

Figure 3:
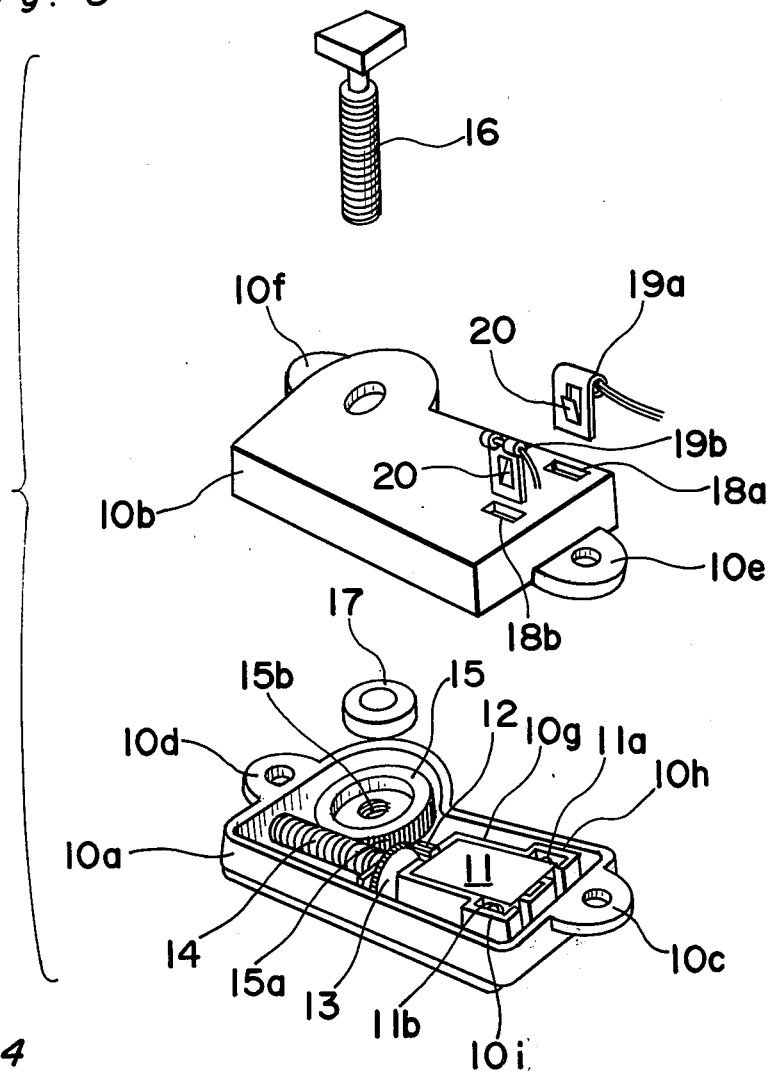
FIG. 3 is an exploded view of a driving unit employed in the arrangement of FIG. 1.

Each of the driving units 3a and 3b has a housing 10, which further includes an upper first housing 10a and a lower second housing 10b (FIG. 3). The upper housing 10a is combined, at its bracket portions 10c and 10d, with corresponding brackets 10e and 10f of the lower housing 10b, and thus, the housing 10 is secured, for example, by set screws, through brackets 10f and 10d at one end thereof, and 10e and 10c at the other end thereof, to the fixing base 7 and another fixing portion 7a or fixing portions 7b and 7c provided in the interior of the mirror case 1 (FIG. 1).

In each of the housings 10 of the driving units 3a and 3b, there is accommodated a reversible motor 11, a gear 12 fixedly mounted on an output shaft of motor 11, a gear 13 in mesh with gear 12, a worm 14 which rotates as one unit with the gear 13, another gear 15 having peripheral teeth 15a engaging worm 14 and also having a central internally threaded bore 15b, a threaded mirror push-pull control shaft 16 screwed into threaded bore 15b of the gear 15, and an annular felt sealing member 17 which is received in a space 10j (FIG. 2) formed in the lower housing 10b and through which the control shaft 16 extends.

Figure 4:
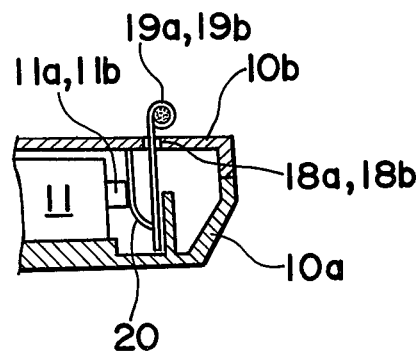
FIG. 4 is a fragmentary sectional view of an essential portion of the driving unit of FIG. 3.

The motor 11 is accommodated in a space defined in the housing 10 by a frame-like inner wall 10g, with a pair of opposed terminals 11a and 11b extending outwardly from the motor 11 into corresponding recesses 10h and 10i formed in the inner wall 10g. Into the above recesses 10h and 10i, there are further inserted, through openings 18a and 18b formed in the lower housing 10b, a pair of terminal plates 19a and 19b, each of which has a bent portion 20 formed by cutting and raising part of the plate 19a or 19b. The respective bent portions 20 contact under pressure the corresponding terminals 11a and 11b of the motor 11, and simultaneously, engage the inner surface of the lower housing 10b for retaining purposes (FIG. 4).

The forward end of the mirror push-pull control shaft 16 extends out of the lower housing 10b, and is suitably connected to the corresponding one of the bearing portions 6 at the left side of the back cover member 4 or to the other bearing portion 6 at the lower side thereof. It is to be noted that the mirror push-pull control shaft 16 may be made, for example, of a flexible material such as synthetic resin or the like.

In the above arrangement, for effecting the angle adjustments, for example, by moving or tilting the mirror 2 in the lateral directions, the motor 11 of the driving unit 3a at the left side in FIG. 1 is rotated in the forward or reverse direction by actuating a remote control switch (not shown) mounted on an instrument panel of a motor vehicle (not shown) for advancing or retracting the mirror push-pull control shaft 16 through the power transmission members such as the gears 12 and 13, worm 14, gear 15, etc. described earlier, and thus, the mirror 2 may be tilted rightward or leftward about the spherical portion 5 of the back cover member 4 together with the back cover member. For the vertical, i.e. upward or downward, tilting of the mirror 2, driving unit 3b may be driven in a similar manner, although the detailed description thereof is abbreviated here for brevity.

As is clear from the foregoing description, according to the mirror angle adjusting arrangement of the present invention, since the driving unit for laterally moving the mirror and the driving unit for vertically tilting the mirror are incorporated into units of the same construction, each of the driving units may be made compact in size and simple in structure, while the two units can be readily incorporated into the mirror case by only differentating the orientation thereof. Furthermore, owing to the arrangement that the housing for each driving unit has only to accommodate therein one driving mechanism, without any particular connection thereof to the back cover member of the mirror, the shape of the entire angle adjusting arrangement is extremely simplified, with consequent reduction in the restrictions for designing the mirror case in which the housings are to be accommodated. Moreover, since the driving units may be replaced independently, the maintenance and repair of the angle adjusting arrangement have been remarkably facilitated.

It is to be noted here that, in the foregoing embodiment, although the present invention has been mainly described with reference to a mirror angle adjusting arrangement for a motor vehicle and the like, the concept of the present invention is not limited in its application to such angle adjusting arrangement of mirrors alone, but may readily be applied to angle adjustments through remote control in general, for example, adjustments of antenna directions in radio transmission and reception, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for adjusting the angular position of an element about two axes, said apparatus comprising:
   a case having a fixing base;
   a back cover member supporting an element to be adjusted and including a rear face having approximately a central portion thereof pivotally connected to said fixing base at a pivot point;
   a first driving unit positioned within said case on one side of a first axis extending through said pivot point for pivoting said back cover member and element about said first axis;

a second driving unit positioned within said case on one side of a second axis extending through said pivot point substantially at a right angle to said first axis for pivoting said back cover member and element about said second axis; and said first and second driving units being of substantially identical construction, and each said driving unit comprising a housing fixed within said case and including first and second housing portions, a reversible motor within said housing, a push-pull control shaft extending from said housing and having an outer end connected to said rear face of said back cover member, and power transmitting means connecting said motor to said control shaft, such that selective reversible operation of said motor selectively advances and retracts said control shaft axially thereof with respect to said housing, thereby pivoting said back cover member and element in opposite directions about the respective said axis.

2. An apparatus as claimed in claim 1, wherein said case comprises a mirror case for a motor vehicle, said element comprises a mirror, and said first and second axes respectively are adapted to extend approximately vertically and horizontally.

3. An apparatus as claimed in claim 1, wherein said back cover member is pivotally connected to said fixing base by means of a spherical portion provided at approximately said central portion of said rear face of said back cover member and movably received in a semi-spherical recess formed at a forward end of a projecting portion extending upwardly from a support member secured to said fixing base.

4. An apparatus as claimed in claim 1, wherein said power transmitting means of each said driving unit comprises a gear train connected to an output shaft of said reversible motor and threadedly coupled to said control shaft for the selective advancing and retraction of said control shaft with respect to said housing.

5. An apparatus as claimed in claim 4, wherein said control shafts are coupled, at respective said outer ends thereof, to corresponding bearing portions provided on said rear face of said back cover member.

6. An apparatus as claimed in claim 1, wherein said driving units are oriented within said case such that one of said driving units is directed as is the other of said driving units but rotated by 180° with respect thereto.

* * * * *